United States Patent [19]
Meiser et al.

[11] 3,898,341
[45] Aug. 5, 1975

[54] COMBATING FUNGI WITH DERIVATIVES OF 1-IMIDAZOLYL- ETHANONES-(2)

[75] Inventors: Werner Meiser; Karl Heinz Büchel; Wolfgang Krämer, all of Wuppertal; Ferdinand Grewe, Buscheid; Paul-Ernst Frohberger, Leverkusen, all of Germany

[73] Assignee: Bayer Aktiengesellschaft, Leverkusen, Germany

[22] Filed: May 14, 1974

[21] Appl. No.: 469,938

[30] Foreign Application Priority Data
May 18, 1973 Germany............................ 2325156

[52] U.S. Cl. ............................................... 424/273
[51] Int. Cl. ................................................ A01n 9/22
[58] Field of Search................... 424/273; 260/309

[56] References Cited
UNITED STATES PATENTS

| | | | |
|---|---|---|---|
| 3,575,999 | 4/1971 | Godefroi et al. | 424/273 |
| 3,793,453 | 2/1974 | Godefroi et al. | 424/273 |
| 3,812,142 | 5/1974 | Meiser et al. | 260/309 |

Primary Examiner—Albert T. Meyers
Assistant Examiner—D. W. Robinson
Attorney, Agent, or Firm—Burgess, Dinklage & Sprung

[57] ABSTRACT

Combating fungi with imidazole derivatives of the formula

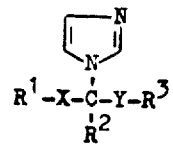

in which
  $R^1$ and $R^3$ each independently is an optionally substituted alkyl, alkenyl, alkynyl, cycloalkyl, cycloalkenyl, aryl or aralkyl radical, and
  $R^2$ is hydrogen or one of the radicals recited for $R^1$,
  X is oxygen or sulfur, and
  Y is a keto group or a functional derivative of a keto group,
and their salts.

8 Claims, No Drawings

COMBATING FUNGI WITH DERIVATIVES OF 1-IMIDAZOLYL- ETHANONES-(2)

The present invention relates to and has for its objects the combating of fungi and microbes using substituted 1-imidazole-ethanones-(2), including active compositions in the form of mixtures of such compounds with solid and liquid dispersible carrier vehicles, and methods for using such compounds in combating fungi and microbes, with other and further objects becoming apparent from a study of the within specification and accompanying examples.

It has been disclosed in Belgian Patent 738,095 and U.S. Pat. No. 3,321,366 that tris-phenyl-1,2,4-triazolyl-(1)-methane (Compound A) and tris-phenyl-imidazolyl-(1)-methane (Compound B) display a good fungicidal activity. The action of these compounds is, however, not always entirely satisfactory in the case of some types of powdery mildew, especially in the case of powdery mildew of cereals, apples or cucumber, when the compounds are used in low concentrations. The same is true of the known zinc ethylene-1,2-bis-dithiocarbamate (Compound C) as taught in Phytopathology 33, 1113 (1943). Moreover, its activity as a seed dressing is not always adequate. Furthermore, the good disinfectant and preservative action of phenyl-mercury acetate is known. However, mercury compounds are frequently very toxic and ecologically not always entirely safe.

It has been found that the known imidazole derivatives of the formula

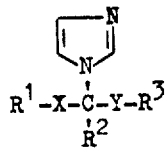

in which
R$^1$ and R$^3$ each independently is an optionally substituted alkyl, alkenyl, alkynyl, cycloalkyl, cycloalkenyl, aryl or aralkyl radical, and
R$^2$ is hydrogen or one of the radicals recited for R$^1$,
X is oxygen or sulfur, and
Y is a keto group,
and their salts, display strong fungicidal and microbicidal properties.

Surprisingly, the imidazole derivatives which can be used according to the invention display a substantially greater fungicidal action than the triazole derivatives known from the state of the art, such as, for example, tris-phenyl-1,2,4-triazolyl-(1)-methane, or carbamic acid derivatives, such as zinc ethylene-1,2-bis-dithiocarbamate. The invention thus represents an enrichment of the art.

Preferably R$^1$, R$^2$ and R$^3$ (which need not be identical) are each a straight-chain or branched alkyl, alkenyl or alkynyl radical with up to 8 carbon atoms, preferably up to 4 carbon atoms, a cycloalkyl radical with 3 to 7, especially with 3, 5 or 6, carbon atoms, a cycloalkenyl radical with 5 to 7, especially 5 or 6, carbon atoms, or an aryl or aralkyl radical with a total of 6 to 10 carbon atoms, any of which radicals can contain one or more, preferably one or two, substituents, preferred substituents being alkyl, alkoxy and alkylmercapto each with up to 3 carbon atoms, electronegative radicals (for example fluorine, chlorine, bromine and iodine, preferably fluorine, chlorine and bromine; halogenoalkyl with 1 to 4, preferably 1 or 2, carbon atoms and 1 to 7, preferably 1 to 3, halogen atoms, preferably fluorine, chlorine and bromine, amongst such halogenoalkyl groups, the trifluoromethyl and pentafluoroethyl groups being preferred; nitro; nitrile; an SO-alkyl group or an SO$_2$-alkyl group wherein the alkyl part of each of these is straight-chain or branched and preferably contains 1 to 4 carbon atoms; and an SO-alkenyl group or an SO$_2$-alkenyl group wherein the alkenyl moiety of each of these preferably contains 2 or 3 carbon atoms), and R$^1$ may further be optionally halo-substituted-phenyl- or -phenoxy-aryl, and R$^2$ alternatively may be hydrogen; and Y is a carbonyl group —CO—, which can optionally be in the hydrated form — C(OH)$_2$—, or a ketal group —C(OR)$_2$—, wherein R is an alkyl radical with, preferably, 1 or 2 carbon atoms.

As salts of the imidazolyl compounds (I), the salts with physiologically tolerated acids are preferred. Examples of such acids are the hydrogen halide acids, for example hydrobromic acid and, especially, hydrochloric acid; phosphoric acid; monofunctional and bifunctional aliphatic or aromatic carboxylic acids, such as succinic acid, fumaric acid, tartaric acid, citric acid, salicyclic acid, sorbic acid and lactic acid; and 1,5-naphthalenedisulfonic acid.

The compounds of the formula (I) to be used according to the invention are known (see German Published Specification DOS 2,105,490), as is their preparation by three different methods. The compounds are obtained, for example, by reacting halogenoalkyl ketones, in polar organic solvents, with excess imidazole at, preferably, 80° to 120°C. Detailed data thereon are to be found in the preparative examples hereinbelow, which also list a substantial number of compounds which can be used according to the invention.

The active compounds according to the invention display a strong fungitoxic action. They do not harm crop plants in the concentrations required to combat fungi. For these reasons they are suitable for use as plant-protection agents for combating fungi. Fungitoxic agents are employed in plant protection for combating Archimycetes, Phycomycetes, Ascomycetes, Basidiomycetes and Fungi Imperfecti.

The active compounds according to the invention have a very broad spectrum of action and can be used against parasitic fungi which attack above-ground parts of plants or attack the plants through the soil, and against seed-borne pathogens.

They display a particularly good activity against parasitic fungi on above-ground parts of plants, such as species of Phytophthora, species of Erysiphe, species of Peronospora and species of Venturia, and also against species of Piricularia and species of Pellicularia, for example against the causative organism of powdery mildew of apples (*Podosphaera leuchotricha*), of apple scab (*Fusicladium dendriticum*), of powdery mildew of cereals (*Erysiphe graminis*), of powdery mildew on cucurbits and grasses (*Erysiphe cichoracearum* and *Erysiphe graminis*) and of cereal rust (*Puccinia recondita*). It should be mentioned in particular, that the active compounds according to the invention display not only a protective action but also a curative action, that is to say when used after contamination by the spores of the fungus. In addition, the systemic action of the compounds should be pointed out. Thus it is possible to protect plants against fungal attack by supplying the active compound to the above-ground parts of the plant through the soil and the root. As plant-protection agents, the active compounds according to the invention can be used for the treatment of soil, the treatment of seed and the treatment of aboveground parts of plants.

The active compounds, as stated above display a good microbicidal activity. In particular, they are suitable for preserving wood pulp, the intermediate for the manufacture of paper. As a result of lengthy transportation in ships, moist wood pulp very readily turns moldy. In part, this very moldy wood pulp is no longer usable for the manufacture of finer papers. For a number of years, mercury compounds (for example phenylmercury acetate) have been widely used for this purpose. However, these compounds have a high toxicity towards fish, which is frequently less than 1 ppm/l of water. With the prohibition of these organo-mercury compounds because of toxicological misgivings, the same difficulties of mold formation again arise. The active compounds used according to the present invention possess only a low toxicity towards fish and are therefore suitable for the treatment of wood pulp.

In addition, the plant-growth-regulating action of some active compounds of the general formula (I) should be mentioned.

The compounds according to the invention are well tolerated by plants. They have only a low toxicity towards warm-blooded animals and because of their low odor and their good tolerance are not unpleasant to the human skin when handled.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides or microbicides, or insecticides, acaricides, rodenticides, nematocides, herbicides, fertilizers, bird repellents, growth-regulating agents, plant nutrients and agents for improving the soil, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 1 to 95% by weight, and preferably 5 to 90% by weight, of the mixture, whereas carrier composition mixtures suitable for direct application or field application generally contemplate those in which the active compound is present in an amount substantially between about 0.00001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20-100% by weight of the active compound.

When used as leaf fungicides, the active compound concentrations in the compositions can be varied within a fairly wide range. They are generally between 0.1 and 0.00001 per cent by weight, preferably between 0.05 and 0.0001 per cent.

In the treatment of seed, amounts of active compound of 0.001 to 50 g per kilogram of seed are generally required, preferably 0.01 to 10 g per kilogram.

The treatment of soil generally requires amounts of active compound of 1 to 1,000 g per cubic meter of soil, preferably of 10 to 200 g per cubic meter.

Furthermore, the present invention contemplates methods of selectively killing, combating or controlling pests, e.g. fungi and microbes, which comprises applying to at least one of correspondingly (a) such fungi, (b) such microbes, and (c) the corresponding habitat thereof, i.e. the locus to be protected, a correspondingly combative or toxic amount, i.e. a fungicidally or microbicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dry dressing, moist dressing, wet dressing, slurry dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples.

EXAMPLE 1

Shoot treatment test/powdery mildew of cereals/protective (leaf-destructive mycosis)

To produce a suitable preparation of active compound, 0.25 g part by weight of active compound was taken up in 25 parts by weight of dimethylformamide and 0.06 part by weight of alkylaryl polyglycol ether emulsifier, and 975 parts by weight of water were added. The concentrate was diluted with water to the desired final concentration of the spray liquor.

To test for protective activity, single-leaved young barley plants of the Amsel variety were sprayed with the preparation of active compound until dew-moist. After drying, the young barley plants were dusted with spores of *Erysiphe graminis* var. hordei.

After 6 days' dwell time of the plants at a temperature of 21°-22°C and 80-90% atmospheric humidity the occurrence of mildew pustules on the plants was evaluated. The degree of infection was expressed as a percentage of the infection of the untreated control plants. 0% denotes no infection and 100% denotes the same degree of infection as in the case of the untreated control. The active compound is the more active, the lower the degree of mildew infection.

The active compounds, active-compound concentration in the spray liquor and degrees of infection can be seen from the table which follows:

Table 1

Shoot treatment test/powdery mildew of cereals/protective

| Active compounds | | Active compound concentration in the spray liquor in % by weight | Infection in % of the untreated control |
|---|---|---|---|
| Untreated | | – | 100.0 |
| 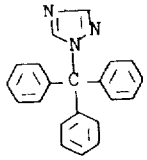 | (known) (A) | 0.01<br>0.001 | 50.0<br>68.8 |
| 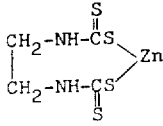 | (known) (C) | 0.01 | 68.8 |
| 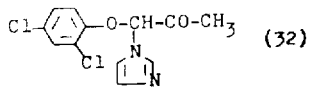 | (32) | 0.01 | 25.0 |
| 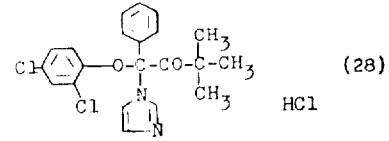 | (28) | 0.01<br>0.001<br>0.0005 | 0.0<br>0.0<br>43.8 |

Table 1 (continued)
| Active compounds | | Active compound concentration in the spray liquor in % by weight | Infection in % of the untreated control |
|---|---|---|---|
| 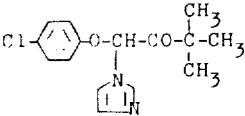 | (3) | 0.01<br>0.001<br>0.00025 | 0.0<br>0.0<br>0.0 |
| 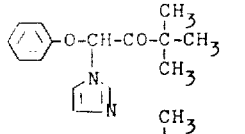 | (17) | 0.01<br>0.001<br>0.0005<br>0.00025 | 0.0<br>0.0<br>5.0<br>26.3 |
| 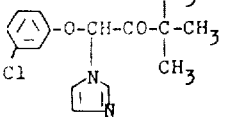 | (33) | 0.01<br>0.005 | 0.0<br>15.0 |
| 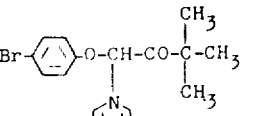 | (20) | 0.01<br>0.001<br>0.0005 | 0.0<br>0.0<br>0.0 |
| 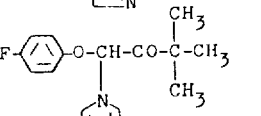 | (22) | 0.01<br>0.001 | 0.0<br>0.0 |
| 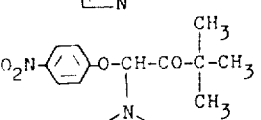 | (23) | 0.01<br>0.001 | 0.0<br>0.0 |
| 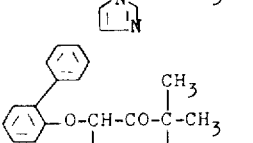 | (24) | 0.01 | 0.0 |
| 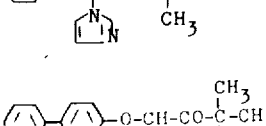 | (21) | 0.01<br>0.001<br>0.00025 | 0.0<br>6.3<br>25.0 |
| 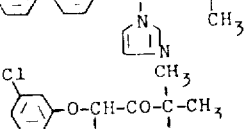 | (13) | 0.01<br>0.001<br>0.00025 | 0.0<br>0.0<br>16.3 |
| 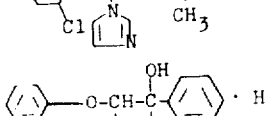 | (8) | 0.01 | 0.0 |
| 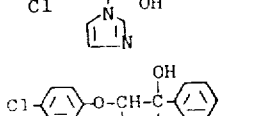 | (6) | 0.01<br>0.005 | 0.0<br>41.3 |
| 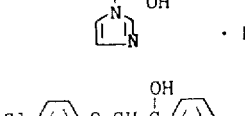 | (7) | 0.01<br>0.005 | 0.0<br>0.0 |
| 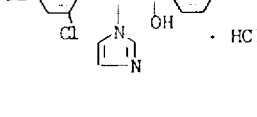 | (5) | 0.01 | 0.0 |

EXAMPLE 2

Shoot treatment test/powdery mildew of cereals/curative (leaf-destructive mycosis)

To produce a suitable preparation of active compound, 0.25 part by weight of active compound was taken up in 25 parts by weight of dimethylformamide and 0.06 part by weight of alkylaryl polyglycol ether emulsifier, and 975 parts by weight of water were added. The concentrate was diluted with water to the desired final concentration of the spray liquor.

The curative activity was tested by following the same procedure as when testing the protective activity, but in the converse sequence. The one-leaved young barley plants were treated with the preparation of active compound 48 hours after the inoculation, when the infection was already manifest.

After 6 days' dwell time of the plants at a temperature of 21°–22°C and 80–90% atmospheric humidity the occurrence of mildew pustules on the plants was evaluated. The degree of infection was expressed as a percentage of the infection of the untreated control plants. 0% denotes no infection and 100% denotes the same degree of infection as in the case of the untreated control. The activity of the compound varies inversely with the degree of mildew infection.

The active compounds, active-compound concentration in the spray liquor and degrees of infection can be seen from the table which follows:

Table 2

Shoot treatment test/powdery mildew of cereals/curative

| Active compounds | Active compound concentration in the spray liquor in % by weight | Infection in % of the untreated control |
|---|---|---|
| Untreated | – | 100.0 |
| 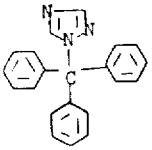 (known) (A) | 0.01 | 100.0 |
| 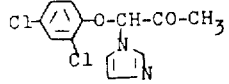 (32) | 0.01 | 12.5 |
| 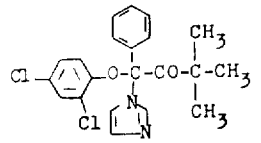 · HCl (28) | 0.01<br>0.001<br>0.0005 | 0.0<br>0.0<br>16.3 |
| 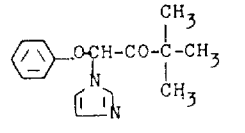 (17) | 0.01<br>0.001<br>0.0001<br>0.00005<br>0.000025 | 0.0<br>0.0<br>0.0<br>0.0<br>26.3 |
| 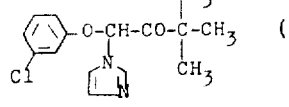 (33) | 0.01<br>0.001 | 0.0<br>15.0 |
| 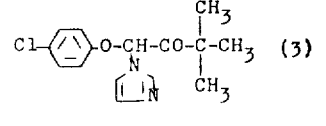 (3) | 0.001<br>0.00025<br>0.0001 | 0.0<br>0.0<br>15.0 |
| 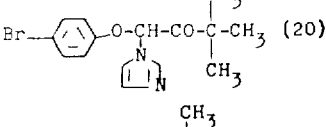 (20) | 0.01<br>0.001<br>0.0001 | 0.0<br>0.0<br>18.0 |
| 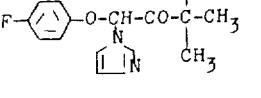 (22) | 0.01<br>0.001<br>0.0001 | 0.0<br>0.0<br>0.0 |
| 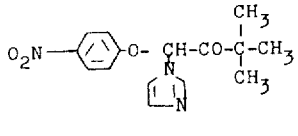 (23) | 0.01<br>0.001 | 0.0<br>16.3 |

Table 2 (continued)

| Active compounds | | Active compound concentration in the spray liquor in % by weight | Infection in % of the untreated control |
|---|---|---|---|
| [structure] (21) | | 0.01<br>0.001<br>0.00025 | 0.0<br>0.0<br>20.0 |
| [structure] (13) | | 0.001 | 18.8 |
| [structure] (25) | | 0.01 | 0.0 |
| [structure] (2) | | 0.01<br>0.0025<br>0.001 | 0.0<br>0.0<br>30.0 |
| [structure] · HCl (7) | | 0.01<br>0.001 | 0.0<br>15.0 |
| [structure] (5) | | 0.01 | 5.0 |

EXAMPLE 3

Powdery mildew of barley (*Erysiphe graminis* var: Hordei/systemic (fungal disease of cereal shoots)

The active compounds were used as pulverulent seed treatment agents. They were prepared by extending the particular active compound with a mixture of equal parts by weight of talc and kieselguhr to give a finely pulverulent mixture of the desired concentration of active compound.

For the treatment of seed, barley seed was shaken with the mixture of active compound and extender in a closed glass bottle. The seed was sown at the rate of 3 × 12 grains in flowerpots, 2 cm deep in a mixture of one part by volume of Fruhstorfer standard soil and one part by volume of quartz sand. The germination and emergence took place under favorable conditions in a greenhouse. 7 days after sowing, when the barley plants had developed their first leaf, they were dusted with fresh spores of *Erysiphe graminis* var. Hordei and grown on at 21°–22°C and 80–90% relative atmospheric humidity and 16 hours' exposure to light. The typical mildew pustules formed on the leaves over the course of 6 days.

The degree of infection was expressed as a percentage of the infection of the untreated control plants. Thus, 0% denotes no infection and 100% denotes the same degree of infection as in the case of the untreated control. The activity of the compound varies inversely with the degree of mildew infection.

The active compounds and concentrations of active compound in the seed-treatment agent, as well as the amount used of the latter, and the percentage infection with mildew can be seen from the table which follows:

Table 3

Powdery mildew of barley test (*Erysiphe graminis* var. hordei/systemic)

| Active compounds | | Active compound concentration in the dressing in % by weight | Amount of dressing used in g/kg of seed | Infection in % of the untreated control |
|---|---|---|---|---|
| Without dressing | | – | – | 100.0 |
| [structure] (known) | (B) | 30 | 10 | 100.0 |
| [structure with Zn] (known) | (C) | 30 | 10 | 100.0 |

Table 3 (continued)

| Active compounds | | Active compound concentration in the dressing in % by weight | Amount of dressing used in g/kg of seed | Infection in % of the untreated control |
|---|---|---|---|---|
| [phenyl]-O-CH-CO-C(CH₃)₂-CH₃ with imidazole | (17) | 50<br>50 | 5<br>2 | 0.0<br>76.3 |
| Cl-[phenyl]-O-CH-CO-C(CH₃)₂-CH₃ with imidazole | (3) | 25 | 10 | 0.0 |
| Br-[phenyl]-O-CH-CO-C(CH₃)₂-CH₃ with imidazole | (20) | 25 | 10 | 0.0 |
| [biphenyl]-O-CH-CO-C(CH₃)₂-CH₃ with imidazole | (21) | 25 | 10 | 0.0 |

EXAMPLE 4

Shoot treatment test/cereal rust (leaf-destructive mycosis)

To produce a suitable preparation of active compound, 0.25 part by weight of active compound was taken up in 25 parts by weight of dimethylformamide and 0.06 part by weight of alkylaryl polyglycol ether emulsifier, and 975 parts by weight of water were added. The concentrate was diluted with water to the desired final concentration of the spray liquor.

To test the protective activity, one-leaved young wheat plants of the Michigan Amber variety were inoculated with a uredospore suspension of *Puccinia recondita* in 0.1% strength aqueous agar. After the spore suspension had dried on, the wheat plants were sprayed with the preparation of active compound until dew-moist and were placed, for incubation, in a greenhouse for 24 hours at about 20°C and 100% relative atmospheric humidity.

After 10 days' dwell time of the plants at a temperature of 20°C and 8–90% atmospheric humidity, the occurrence of rust pustules on the plant was evaluated. The degree of infection was expressed as a percentage of the infection of the untreated control plants. 0% denotes no infection and 100% denotes the same degree of infection as in the case of the untreated control. The activity of the compound varies inversely with the degree of rust infection.

The active compounds, active compound concentrations in the spray liquor and degrees of infection can be seen from the table which follows:

Table 4

Shoot treatment test/cereal rust/protective

| Active compounds | | Active compound concentration in the spray liquor in % by weight | Infection in % of the untreated control |
|---|---|---|---|
| Untreated | | – | 100.0 |
| triphenyl-imidazole (known) | (B) | 0.3<br>0.1 | 100.0<br>100.0 |
| CH₂-NH-CS-S / Zn \ CH₂-NH-CS-S (known) | (C) | 0.025<br>0.01 | 100.0<br>100.0 |
| [phenyl]-O-CH-CO-C(CH₃)₂-CH₃ with imidazole | (17) | 0.025<br>0.01 | 0.0<br>27.5 |
| [pyridyl-phenyl]-O-CH-CO-C(CH₃)₂-CH₃ Cl with imidazole | (25) | 0.025<br>0.01 | 25.0<br>25.0 |

EXAMPLE 5

Erysiphe test

Solvent: 4.7 parts by weight of acetone
Emulsifier: 0.3 part by weight of alkylaryl polyglycol ether
Water: 95 parts by weight The amount of the active compound required for the desired concentration of active compound in the spray liquid was mixed with the stated amount of the solvent, and the concentrate was diluted with the stated amount of water containing the stated conditions.

Young cucumber plants with about three foliage leaves were sprayed with the spray liquid until dripping wet. The cucumber plants remained in a greenhouse for 24 hours to dry. They were then, for the purpose of inoculation, dusted with conidia of the fungus *Erysiphe cichoracearum*. The plants were subsequently placed in a greenhouse at 23°–24°C and at a relative atmospheric humidity of about 75%.

After 12 days, the infection of the cucumber plants was determined as a percentage of the untreated but also inoculated control plants. 0% means no infection; 100% that the infection was exactly as great as in the case of the control plants.

The active compounds, the concentrations of the active compounds and the results can be seen from the following table:

Table 5

Erysiphe test

| Active compound | | Infection in % of the infection of the untreated control at an active compound concentration in the spray liquor of 0.0001% by weight |
|---|---|---|
| [structure] (known) | (B) | 47 |
| [structure] | (2) | 10 |
| [structure] · HCl | (28) | 4 |
| [structure] | (3) | 27 |

EXAMPLE 6

Erysiphe test/systemic

Solvent: 4.7 parts by weight of acetone
Emulsifier: 0.3 part by weight of alkylaryl polyglycol ether
Water: 95 parts by weight The amount of active compound required to give the desired concentration of active compound in the watering liquid was mixed with the stated amount of solvent and the concentrate was diluted with the stated amount of water which contained the stated additives.

Cucumber plants grown in standard soil, in the 1–2 leaf stage, were watered three times within one week with 20 ml of the watering liquid, of the stated concentration of active compound, per 100 ml of soil.

The plants treated in this way were inoculated, after treatment, with conidia of the fungus *Erysiphe cichoracearum*. The plants were then set up in a greenhouse at 23°–24°C and 70% relative atmospheric humidity. After 12 days, the infection of the cucumber plants was determined as a percentage of the untreated, but also inoculated, control plants.

0% denotes no infection and 100% denotes that the infection was exactly as great as in the case of the control plants.

The active compounds, active-compound concentrations and results can be seen from the table which follows:

Table 6

Erysiphe test/systemic

| Active compound | | Infection in % of the untreated control at an active compound concentration of 120 ppm |
|---|---|---|
| 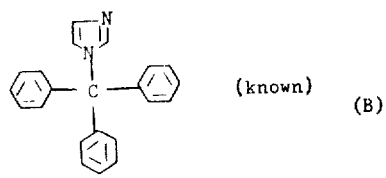 | (known) (B) | 100 |
| 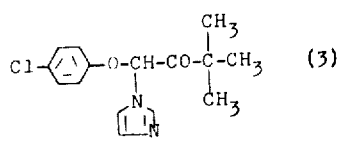 | (3) | 0 |
| 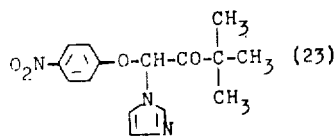 | (23) | 0 |

EXAMPLE 7

Fusicladium test (apple scab) [Curative]

Solvent: 4.7 parts by weight of acetone
Emulsifier: 0.3 part by weight of alkylaryl polyglycol ether
Water: 95 parts by weight The amount of active compound required for the desired concentration of the active compound in the spray liquid was mixed with the stated amount of solvent, and the concentrate was diluted with the stated amount of water which contained the stated additions.

Young apple seedlings in the 4 – 6 leaf stage were inoculated with an aqueous conidium suspension of the apple scab causative organism (*Fusicladium dendriticum Fuckel*) and incubated for 18 hours in a humidity chamber at 18° – 20°C and at a relative atmospheric humidity of 100%. The plants were then brought into a greenhouse and allowed to dry.

After standing for a suitable period of time, the plants were sprayed dripping wet with the spray liquid prepared in the manner described above. The plants were then again brought into a greenhouse.

15 days after inoculation, the infection of the apple seedlings was determined as a percentage of the untreated but also inoculated control plants.

0% means no infection; 100% means that the infection was exactly as great as in the case of the control plants.

The active compounds, the concentrations of the active compounds, the period of time between inoculation and spraying and the results obtained can be seen from the following table:

Table 7

Fusicladium test/curative

| Active compound | | Dwell time in hours | Infection in % of the infection of the untreated control at an active compound concentration (in % by weight) of 0.025 |
|---|---|---|---|
| 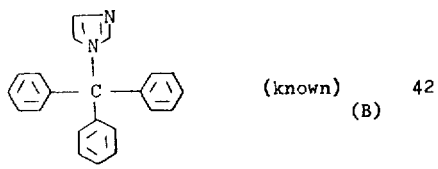 | (known) (B) | 42 | 100 |
| 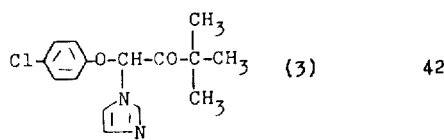 | (3) | 42 | 6 |
| 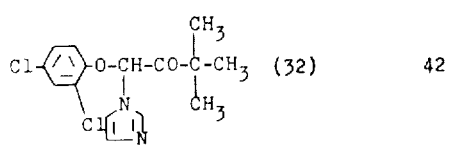 | (32) | 42 | 21 |

EXAMPLE 8

Microbicidal action/preservation of mechanical wood pulp

To carry out the experiments, mechanical wood pulp of the water content indicated in the table was treated at various concentrations. Pieces of size 2 × 2 cm were placed on the nutrient medium inoculated with fungi, and incubated, and thereafter the inhibition zones were measured. In addition, pieces of size 10 × 10 cm were buried in soil and the degree of rotting after 3 weeks was ascertained.

The concentrations indicated in the table which follows are based on the dry weights.

The figures shown under the column heading "degree of rotting" denote:

0 = no visible rotting
1 = moderate fungal attack
2 = strong fungal attack
3 = complete rotting

Table 8

Microbicidal action/preservation of mechanical wood pulp

Water content of the wood pulp: 50%

| Active compound | Concentration % | Inhibition zones in mm, Aspergillus terreus | Degree of rotting after 3 weeks | Toxicity to fish mg/l of water |
|---|---|---|---|---|
| (Control) | - | 0 | 1-2 | - |
| Br-⟨⟩-O-CH(CH₃)-CO-C(CH₃)₃-N-imidazolyl (20) | 0.1 | 1-3 | 1-2 | 20-30 |
| ⟨⟩-⟨⟩-O-CH(CH₃)-CO-C(CH₃)₃-N-imidazolyl (21) | 0.1 | 1-3 | 1-2 | 20-30 |

The preparation of the compounds used in the present invention is illustrated in the following Examples.

EXAMPLE 9 a. ω-Bromo-ω-[(2',6'-dichloro)-phenoxy]-acetophenone (melting point 58°C), used as the starting compound, was prepared by condensation of ω-chloroacetophenone and 2,6-dichlorophenol. The ω-[(2',6'-dichloro)-phenoxy]-acetophenone first produced was brominated with bromine at 140°C in the usual manner.

The starting compounds employed in the examples hereinbelow were prepared analogously.

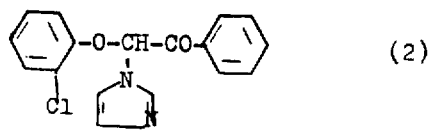

(1)

18 g (0.05 mole) of ω-bromo-ω-[(2',6'-dichloro)-phenoxy]acetophenone and 12 g (0.18 mole) of imidazole were dissolved in 120 ml of acetonitrile and the solution was heated under reflux for 18 hours. The solvent was then distilled off in vacuo. The residue was taken up in 150 ml of water and 3 × 40 ml of methylene chloride and the organic phase was separated off and shaken twice more with 30 ml of water at a time. The resulting methylene chloride solution was dried and the solvent was distilled off in vacuo. The oil thus obtained was taken up in ethyl acetate and a solution of hydrochloric acid in ether was added, whereupon a crystalline precipitate formed. This could be recrystallized from ethanol or isopropanol. 9 g (47% of theory) of ω-[imidazolyl]-ω-[(2',6'-dichloro)-phenoxy]-acetophenone were obtained as the hydrochloride of melting point 218°C.

EXAMPLE 10

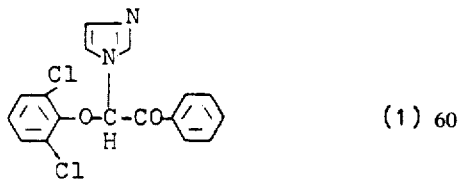

(2)

A solution of 35.25 g (0.1 mole) of ω-bromo-ω-[(2'-chloro)-phenoxy]-acetophenone and 24 g (0.35 mole) of imidazole in 240 ml of acetonitrile was boiled for 18 hours under reflux. After distilling off the solvent in vacuo, 300 ml of water were added to the residue and the aqueous phase was extracted with methylene chloride. The organic phase was then extracted by shaking twice with 80 ml of water each time and was dried. The smeary residue obtained after distilling off the solvent in vacuo disintegrated on addition of anhydrous ether and became crystalline. 22 g of ω-[imidazolyl]-ω-[(2'-chloro)-phenoxy]-acetophenone (= 70% of theory) of melting point 95°C were obtained.

A solution of the free base in ether could be treated with hydrochloric acid in ether, whereupon the hydrochloride of the product mentioned precipitated as crystals. The hydrochloride of ω-[imidazolyl]-ω-[(2'-chloro)-phenoxy]-acetophenone contained, per mole thereof, 1 mole of chemically bound water (or the keto group was present as the hydrate) and had a melting point of 171°C.

EXAMPLE 11 a. 1-Bromo-[1-(4'-chloro)-phenoxy]-3,3-dimethyl-butanone-(2), used as the starting material was obtained from 4-chlorophenol and bromopinacolone, followed by bromination with bromine at 140°C (melting point 80°C).

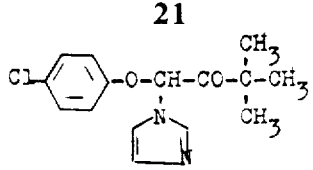

15.25 g (0.05 mole) of 1-bromo-1-[(4'-chloro)-phenoxy]-3-dimethyl-butanone-(2) and 12 g (0.18 mole) of imidazole were dissolved in 120 ml of acetonitrile and the solution was heated to the boil under reflux for 18 hours. After distilling off the solvent in vacuo, 150 ml of water were added to the residue and the aqueous phase was then additionally treated three times with 30 ml of water each time and dried, and the solvent was distilled off in vacuo. After recrystallization of the residue from about 400 ml of ligroin, 10.5g(72% of theory) of 1-imidazolyl-1-[(4'-chloro)-phenoxy]-3,3-dimethyl-butanone-(2) of melting point 135°C were obtained.

The following compounds were prepared analogously:

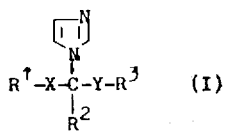

| Compound No. | $R^1$ | $R^2$ | $R^3$ | X | Y | Boiling point (°C/mm Hg), melting point (°C) or refractive index |
|---|---|---|---|---|---|---|
| 4 | Cl,Cl,Cl-phenyl (2,4,5-tri-Cl) | H | phenyl | O | CO | Hydrochloride, 121; Nitrate, 138 |
| 5 | Cl,Cl-phenyl | H | Cl-phenyl | O | CO | 97 |
| 6 | Cl-phenyl | H | phenyl | O | $C(OH)_2$ | Hydrochloride, 135 |
| 7 | Cl,Cl-phenyl | H | phenyl | O | $C(OH)_2$ | Hydrochloride, 155 |
| 8 | Cl-phenyl | H | phenyl | O | $C(OH)_2$ | Hydrochloride, 124 |
| 9 | phenyl | H | phenyl | O | $C(OH)_2$ | Hydrochloride, 171 |
| 10 | Cl-phenyl | phenyl | phenyl | O | CO | 126 |
| 11 | Cl-phenyl | H | phenyl | O | CO | 118 |
| 12 | Cl,Cl-phenyl | H | $C(CH_3)_3$ | O | CO | 119 |
| 13 | Cl,Cl-phenyl | H | $C(CH_3)_3$ | O | CO | 146 |
| 14 | Cl,Cl-phenyl | H | $C(CH_3)_3$ | O | CO | 69 |
| 15 | Cl-phenyl | H | $C(CH_3)_3$ | O | CO | 25 |
| 16 | Cl-phenyl | $CH_3$ | phenyl | S | CO | 170 |
| 17 | phenyl | H | $C(CH_3)_3$ | O | CO | 147/0.01 |
| 18 | Cl-phenyl | H | $C(CH_3)_3$ | S | CO | $n_D^{20}$ 1.7150 |

CONTINUED

| Compound No. | R¹ | R² | R³ | X | Y | Boiling point (°C/mm Hg), melting point (°C) or refractive index |
|---|---|---|---|---|---|---|
| 19 | Cl-⟨C₆H₄⟩- | H | ⟨C₆H₅⟩ | S | CO | Nitrate, 214 |
| 20 | Br-⟨C₆H₄⟩- | H | C(CH₃)₃ | O | CO | 106 |
| 21 | ⟨C₆H₅⟩-⟨C₆H₄⟩- | H | C(CH₃)₃ | O | CO | 104 |
| 22 | F-⟨C₆H₄⟩- | H | C(CH₃)₃ | O | CO | 166/0.01 |
| 23 | O₂N-⟨C₆H₄⟩- | H | C(CH₃)₃ | O | CO | 151 |
| 24 | ⟨C₆H₄⟩(o-C₆H₅)- | H | C(CH₃)₃ | O | CO | 105 |
| 25 | ⟨C₆H₃⟩(Cl)(C₆H₅)- | H | C(CH₃)₃ | O | CO | 155 |
| 26 | (CH₃)₃C-⟨C₆H₄⟩- | H | C(CH₃)₃ | O | CO | Hydrochloride, 140 |
| 27 | ⟨C₆H₅⟩- | H | ⟨C₆H₅⟩ | O | CO | 70 |
| 28 | Cl-⟨C₆H₃⟩-Cl | ⟨C₆H₅⟩ | C(CH₃)₃ | O | CO | Hydrochloride, 208 |
| 29 | Cl-⟨C₆H₄⟩- | ⟨C₆H₅⟩ | C(CH₃)₃ | O | CO | 98-102 |
| 30 | ⟨C₆H₅⟩- | ⟨C₆H₅⟩ | C(CH₃)₃ | O | CO | 120-122 |
| 31 | Cl-⟨C₆H₄⟩- | CH₃ | C(CH₃)₃ | O | CO | $n_D^{20}$ 1.5421 |
| 32 | Cl-⟨C₆H₃⟩-Cl | H | CH₃ | O | CO | 102-106 |
| 33 | ⟨C₆H₄⟩-Cl | H | C(CH₃)₃ | O | CO | 172 |
| 34 | Cl-⟨C₆H₂⟩(Cl)(Cl) | H | ⟨C₆H₅⟩ | O | CO | Hydrochloride, 238 |
| 35 | ⟨C₆H₃⟩(CH₃)(NO₂)- | H | C(CH₃)₃ | O | CO | Hydrochloride, 231 |
| 36 | Br-⟨C₆H₃⟩-Cl | H | C(CH₃)₃ | O | CO | Hydrochloride, 123 |

3,898,341

CONTINUED

| Compound No. | R¹ | R² | R³ | X | Y | Boiling point (°C/mm Hg), melting point (°C) or refractive index |
|---|---|---|---|---|---|---|
| 37 | 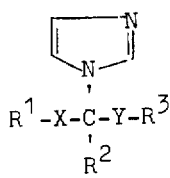 | H | C(CH₃)₃ | O | CO | Hydrochloride, 200-201 |
| 38 | (phenyl with two Cl) | H | C(CH₃)₃ | O | CO | 112-115 |
| 39 | I-phenyl | H | C(CH₃)₃ | O | CO | 90 - 91 |

Other compounds of the general formula $$\underset{R^2}{\overset{}{R^1-X-\overset{|}{C}-Y-R^3}}$$ (with imidazolyl)

which can be similarly prepared and which will be effective in combating fungi and microbes include:

| R¹ | R² | R³ | X | Y |
|---|---|---|---|---|
| Cl-phenyl | H | phenyl-H | O | CO |
| phenyl-CH₂- | H | phenyl | O | CO |
| phenyl | phenyl-CH₂- | C(CH₃)₃ | O | CO |
| phenyl | C(CH₃)₃ | C(CH₃)₃ | O | CO |
| phenyl | CH₂=CH- | C(CH₃)₃ | O | CO |

It will be appreciated that the instant specification and examples are set forth by way of illustration and not limitation, and that various modifications and changes may be made without departing from the spirit and scope of the present invention.

What is claimed is:

1. A method for combatting fungi which comprises applying thereto or to a habitat thereof a fungicidally effective amount of an imidazole derivative of the formula

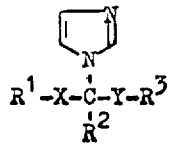

in which

R¹ is benzyl, phenyl, or phenyl substituted with at least one member selected from the group consisting of halo, alkyl with up to 4 carbon atoms, phenyl and nitro, R² is hydrogen, alkyl with up to 4 carbon atoms, benzyl, phenyl or halophenyl, R³ is alkyl with up to 4 carbon atoms, cyclohexyl, phenyl or halophenyl, X is oxygen or sulfur, and Y is a carbonyl group — CO — or a hydrated carbonyl group — C(OH)₂—, or an acid addition salt thereof.

2. The method according to claim 1 in which said imidazole derivative is 1-[imidazolyl]-1-[(2',4',5'-trichloro)-phenoxy]-3,3-dimethyl-butanone-(2) of the formula

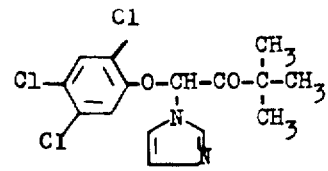

3. The method according to claim 1 in which said imidazole derivative is 1-[imidazolyl]-1-[(2',4'-dichloro)-phenoxy]-3,3-dimethyl-butanone-(2) of the formula

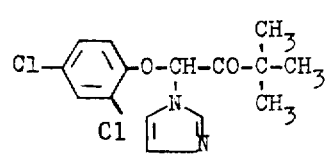

4. The method according to claim 1 in which said imidazole derivative is 1-imidazolyl-1-phenoxy-3,3-dimethylbutanone-(2) of the formula

27

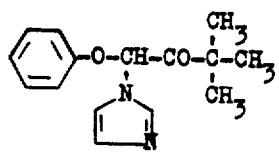

5. The method according to claim 1 in which said imidazole derivative is 1-imidazolyl-1-p-diphenoxy-3,3-dimethylbutanone-(2) of the formula

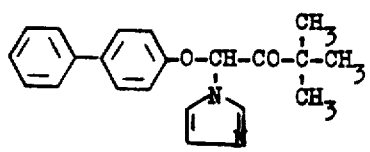

6. The method according to claim 1 in which said imidazole derivative is 1-imidazolyl-1-~(2',4'-dichloro)-phenoxy]-1-phenyl-3,3-dimethyl-butanone-(2) of the formula

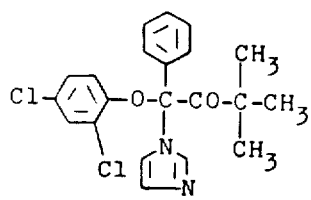

7. A fungicidal composition comprising a fungicidally effective amount of an imidazole derivative of the formula

28

$$R^1-X-\overset{R^2}{\underset{|}{C}}-Y-R^3$$

in which
R$^1$ is benzyl, phenyl, or phenyl substituted with at least one member selected from the group consisting of halo, alkyl with up to 4 carbon atoms, phenyl and nitro,
R$^2$ is hydrogen, alkyl with up to 4 carbon atoms, benzyl, phenyl or halophenyl,
R$^3$ is alkyl with up to 4 carbon atoms, cyclohexyl, phenyl or halophenyl,
X is oxygen or sulfur, and
Y is a carbonyl group —CO — or a hydrated carbonyl group — C(OH)$_2$—,
or an acid addition sale thereof, in admixture with a pesticide diluent.

8. A composition according to claim 7, in which said imidazole derivative is
1-[imidazolyl]-1-[2',4',5'-trichloro)-phenoxy]-3,3-dimethyl-butanone-(2),
1-[imidazolyl]-1-[(2',4'-dichloro)-phenoxy]-3,3-dimethyl-butanone-(2),
1-imidazolyl-1-phenoxy-3,3-dimethyl-butanone-(2),
1-imidazolyl-1-p-diphenoxy-3,3-dimethyl-butanone-(2), or
1-imidazolyl-1-[(2',4'-dichloro)-phenoxy]-1-phenyl-3,3-dimethyl-butanone-(2).

* * * * *